(12) United States Patent
Lu et al.

(10) Patent No.: US 10,670,893 B2
(45) Date of Patent: Jun. 2, 2020

(54) CURVED SURFACE DISPLAY PANEL AND DISPLAY DEVICE

(71) Applicant: WuHan TianMa Micro-Electronics Co., Ltd., Wuhan (CN)

(72) Inventors: Lijun Lu, Wuhan (CN); Jing Li, Wuhan (CN); Yingzhang Qiu, Wuhan (CN); Zhencheng Zhang, Wuhan (CN); Boping Shen, Wuhan (CN); Liangliang Bei, Wuhan (CN); Binyi Zheng, Wuhan (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 16/016,965

(22) Filed: Jun. 25, 2018

(65) Prior Publication Data
US 2019/0163006 A1 May 30, 2019

(30) Foreign Application Priority Data
Nov. 28, 2017 (CN) .......................... 2017 1 1215821

(51) Int. Cl.
*G02F 1/1333* (2006.01)
*G09F 9/35* (2006.01)
(Continued)

(52) U.S. Cl.
CPC .. *G02F 1/133305* (2013.01); *G02F 1/134336* (2013.01); *G09F 9/301* (2013.01); *G09F 9/35* (2013.01); *G02F 2001/134345* (2013.01)

(58) Field of Classification Search
CPC ........ G09G 2320/0626–0686; G02F 1/133305
See application file for complete search history.

(56) References Cited

U.S. PATENT DOCUMENTS 10,345,639 B1* 7/2019 Nakagawa .......... H01L 27/1262
2008/0137013 A1* 6/2008 Kamoshida ....... G02F 1/133305
349/106
(Continued)

FOREIGN PATENT DOCUMENTS

CN 104575322 A 4/2015
CN 105093669 A * 11/2015
(Continued)

OTHER PUBLICATIONS

Chinese Office Action dated Dec. 4, 2019 for corresponding CN Application No. 201711215821.7.

*Primary Examiner* — Michael H Caley
*Assistant Examiner* — Jonathan Y Jung
(74) *Attorney, Agent, or Firm* — Tarolli, Sundheim, Covell & Tummino LLP (57) ABSTRACT

A curved surface display panel and a display device, wherein the curved surface display panel includes a color film substrate having an arc-shaped cross section along a first direction, wherein the color film substrate includes: a first area and a second area arranged along the first direction, a common border between first and second area is first axis; and a plurality of pixel units arranged along first direction, wherein a respective interval separates each adjacent two pixel units of the plurality of pixel units, and the pixel units each has a width in a second direction, the interval between each adjacent two pixel units decreases from first axis towards each side along first direction, and the width in second direction of each pixel unit decreases from the first axis towards each side along the first direction; wherein first direction intersects with second direction.

15 Claims, 7 Drawing Sheets

(51) Int. Cl.
*G02F 1/1343* (2006.01)
*G09F 9/30* (2006.01)

(56) References Cited

U.S. PATENT DOCUMENTS

| | | | | |
|---|---|---|---|---|
| 2015/0029683 | A1* | 1/2015 | Kim | H01L 27/326 |
| | | | | 361/749 |
| 2015/0362796 | A1* | 12/2015 | Kong | G02F 1/136286 |
| | | | | 349/106 |
| 2016/0274420 | A1* | 9/2016 | Oh | G02F 1/133512 |
| 2017/0285392 | A1* | 10/2017 | Hirata | G02F 1/133308 |
| 2018/0136511 | A1* | 5/2018 | Kudo | G02F 1/133512 |
| 2018/0180948 | A1* | 6/2018 | Zhao | G02F 1/134309 |

FOREIGN PATENT DOCUMENTS

| | | | |
|---|---|---|---|
| CN | 105093669 A | | 11/2015 |
| CN | 105739156 A | * | 7/2016 |
| CN | 105739156 A | | 7/2016 |

\* cited by examiner

CURVED SURFACE DISPLAY PANEL AND DISPLAY DEVICE

CROSS-REFERENCE TO RELATED APPLICATIONS

The present application claims priority to Chinese Patent Application No. 201711215821.7, filed on Nov. 28, 2017, the content of which is incorporated herein by reference in its entirety.

TECHNICAL FIELD

The present disclosure relates to the field of display technologies and, in particular, to a curved surface display panel and a display device thereof.

BACKGROUND

With the prevalence of wearable devices, a display device has also developed to have more shapes and structures other than a usual rectangular plane. Since a curved surface display device can visually provide the users with better experience, more and more users prefer the curved device. As a human eye is convex and curved, a curvature of a curved surface display panel in the curved surface device can allow that the respective distance between each position on an eyeball and the curved surface display panel has a same value, so that a better visual experience can brought in. In addition to the visual experience, the curved surface display panel allows the user to have a larger view, because a slightly curved edge toward the user side can be closer to the user so as to achieve substantially a same viewing angle as the center of the curved surface display panel.

In the related art, in the curved surface display panel, there is a slightly bending degree difference between two opposed substrates. In order to balance the bending degrees of the two substrates, the distances between the pixel units on one of the substrates are non-equal-difference intervals.

However, such an arrangement makes the display brightness in each area of the curved surface display panel non-uniform.

SUMMARY

The present disclosure provides a curved surface display panel and a display device, which can alleviate the non-uniform display brightness problem in each area of the curved surface display panel.

In a first aspect, the present disclosure provides a curved surface display panel, and the curved surface display panel includes a color film substrate having an arc-shaped cross section along a first direction. The color film substrate includes: a first area and a second area arranged along the first direction, wherein a common border between the first area and the second area is a first axis; and a plurality of pixel units arranged along the first direction. A respective interval separates each adjacent two pixel units of the plurality of pixel units, and the plurality of pixel units each has a respective width in a second direction, a width of the respective interval between each adjacent two pixel units decreases along the first direction from the first axis towards each side of the first axis along the first direction, and the respective width in the second direction of each pixel unit decreases from the first axis towards each side of the first axis along the first direction. The first direction intersects with the second direction.

In a second aspect, the present disclosure provides a display device including the above-mentioned curved surface display panel.

BRIEF DESCRIPTION OF DRAWINGS

The accompanying drawings are briefly introduced as follows. The drawings are not meant to be limiting; those skilled in the art will be able to see alternative drawings without paying creative effort.

DESCRIPTION OF EMBODIMENTS

In order to make the purpose, technical solutions, and advantages of the embodiments of the present disclosure to be clearer, the technical solutions in the embodiments of the present disclosure are clearly and completely described in the following with reference to the accompanying drawings. Obviously, the described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that, although the symmetric axis may be described using the terms of "first", "second", "third", etc., in the embodiments of the present disclosure, the symmetric axis will not be limited to these terms. These terms are merely used to distinguish symmetric axes from one another. For example, without departing from the scope of the embodiments of the present disclosure, a first symmetric axis may also be referred to as a second symmetric axis, similarly, a second symmetric axis may also be referred to as a first symmetric axis, similarly, a second symmetric axis electrode may also be referred to as a third force electrode, etc.

It should be noted that, the expressions such as "upper", "lower", "left", "right" and the like mentioned in embodiments of the present disclosure are described with reference to the placement status in the accompanying drawings, and should not be construed as limiting embodiments of the present disclosure. In addition, it should also be understood that, in the context, while referring to an element being formed "above" or "below" another element, it is possible that the element is directly formed "above" or "below" the other element, it is also possible that the element is formed "above" or "below" the other element via an intermediate element.

With the gradual emergence of wearable application devices, such as smart glasses, smart watches, etc., there is an increasing demand of the display industry for a curved surface display device with a certain curvature.

Since the curved surface display device has a certain curvature, there is a certain difference in bending degrees between a first substrate and a second substrate in the curved surface display panel, which, to some extent, may lead to a misalignment (it can be understood as a distance for which one substrate moves away from the other substrate in a certain direction), thus, the first substrate cannot completely coincide with the second substrate during an encapsulation process, so that the curved surface display panel has a problem of color mixture or light leakage. For example, when the curved surface display device is a liquid crystal curved surface display device, the first substrate may be understood as a color film substrate, and the second substrate may be understood as an array substrate disposed opposite to the color film substrate. Data line and gate line on the array substrate (the second substrate) intersect with each other to define a pixel unit, and a color resist with an area equal to that of the pixel unit is disposed on the color film substrate. During a process of bonding the array substrate to the color film substrate, the color resist disposed on the color film substrate (the first substrate) cannot coincide with the pixel unit disposed on the array substrate, so that the area of the pixel unit is excessively large, which causes light leakage, and if the misalignment further increases, color mixture may occur, thereby deteriorating the display quality.

In order to solve the above technical problem, the designers propose a design of non-equidistant pixel units, that is, the intervals among the pixel units along a direction in the first substrate are equal-difference intervals (not equal intervals), and intervals among the pixel units along the same direction in the second substrate are equal intervals, thereby solving the problem that the first substrate and the second substrate in the curved panel are misaligned, and thus alleviating the problem of color mixture or light leakage of the curved surface display panel. However, the design of non-equal-interval pixel units causes a new problem in optical displaying. For the non-equal-interval pixel units disposed on the substrate, since intervals among the pixel units are different, pixel distribution density is not uniform, resulting in non-uniform brightness of the curved surface display panel.

In order to solve the above-mentioned technical problem, the inventor has proposed the following technical solution.

Figure 1:
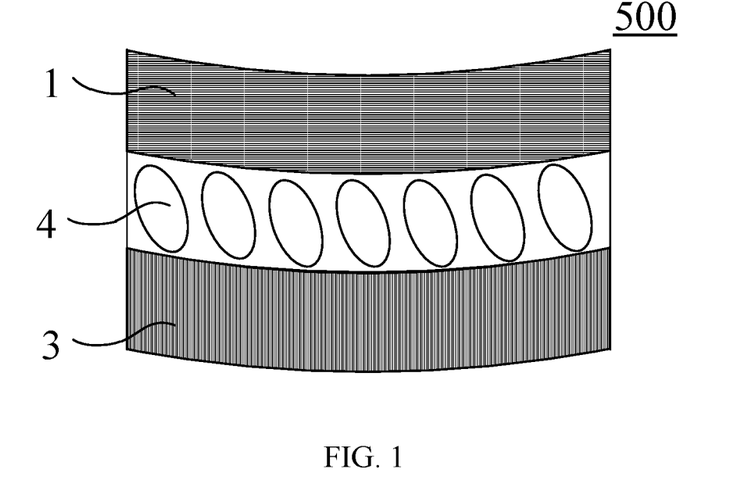
FIG. 1 is a structural schematic diagram of a curved surface display panel according to an embodiment of the present disclosure.

A curved surface display panel is provided by an embodiment, as shown in FIG. 1. FIG. 1 is a structural schematic diagram of a curved surface display panel according to an embodiment of the present disclosure. For example, it is taken an example that the curved surface display panel 500 is a liquid crystal curved surface display panel, and the structure of the curved surface display panel 500 will be described so that those skilled in the art can better understand the solution. The liquid crystal curved surface display panel includes a color film substrate 1 and an array substrate 3 disposed opposite to the color film substrate 1. The liquid crystal display panel further includes a liquid crystal layer 4 disposed between the color film substrate 1 and the array substrate 3. This liquid crystal display panel is a liquid crystal curved surface display panel, and both the color film substrate 1 and the array substrate 3 included in this liquid crystal display panel are also formed as curved surface structures.

Figure 2:
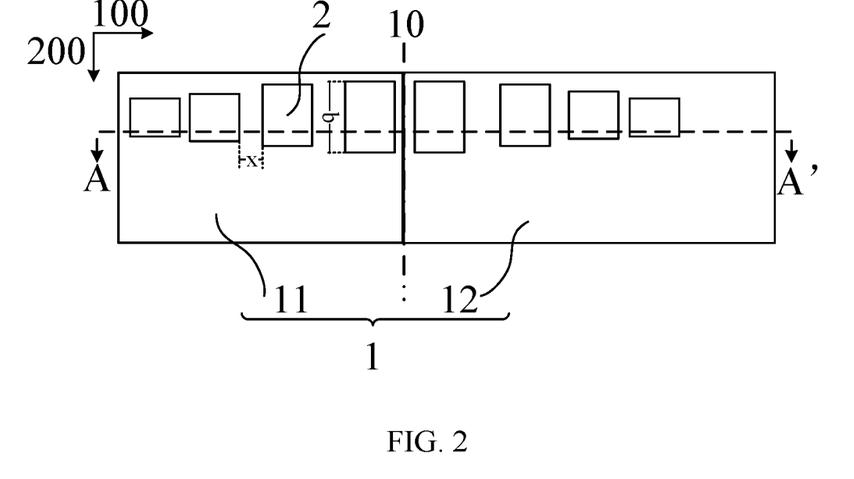
FIG. 2 is a structural schematic diagram of a color film substrate according to an embodiment of the present disclosure.
Figure 3:
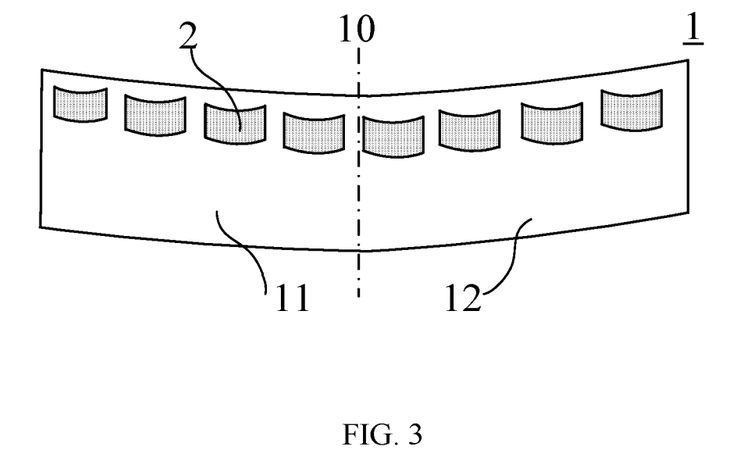
FIG. 3 is a cross-sectional view of AA' position of FIG. 2 according to an embodiment of the present disclosure.

In an embodiment, as shown in FIG. 2 and FIG. 3, wherein FIG. 2 is a structural schematic diagram of a color film substrate according to an embodiment of the present disclosure, FIG. 3 is a cross-sectional view of AA' position of FIG. 2 according to an embodiment of the present disclosure. The curved surface display panel 500 includes a color film substrate 1. The cross-section of the color film substrate 1 in a first direction 100 is arc-shaped. That is, the color film substrate 1 has a certain curvature in the first direction 100. Therefore, the substrate is a curved surface substrate.

With further reference to FIG. 2 and FIG. 3, the color film substrate 1 includes a first area 11 and a second area 12 sequentially disposed along the first direction 100, wherein a common border between the first area 11 and the second area 12 is a first axis 10.

The color film substrate 1 further includes a plurality of pixel units 2 disposed along the first direction 100. A width of the respective interval x between each adjacent two pixel units 2 decreases from the first axis 10 towards each side of the first axis 10 along the first direction 100. A respective width b in the second direction 200 of each pixel unit 2 decreases from the first axis 10 towards each side of the first axis 10 along the first direction 100. The first direction 100 intersects with the second direction 200.

It should be understood that, the color film substrate 1 further includes a black matrix (not shown in the figure), and positions on the color film substrate 1 excluding the positions of the plurality of pixel units 2 are all sheltered by the black matrix. In this case, an aperture area of each pixel unit 2 can be understood as the area occupied by the pixel unit 2. In a certain area (including the black matrix and the pixel unit), the area ratio occupied by the pixel unit 2 can be understood as an aperture ratio of the pixel unit 2. For example, the certain area is 5 cm$^2$, the area of the pixel unit 2 is 3 cm$^2$, in this case, it can be understood that the aperture area of the pixel unit 2 is 3 cm$^2$, and the aperture ratio is 3/5=60%, and the remaining 40% can be understood as the area occupied by the black matrix.

In the related art, in the curved surface display panel with a designed of non-equal intervals, the display brightness in respective areas is non-uniform. After the inventor of the present disclosure studied the curved surface display panel in the display technology, it was found that since the respective aperture area of the respective pixel unit in each area on the curved surface display panel in the related art is identical, a sum of aperture areas of all the pixel units, in the area where the interval between pixel units is relatively small, is relatively large (i.e., the aperture ratio is relatively large), and another sum of aperture areas of all the pixel units, in the area where the interval between pixel units is relatively large, is relatively small (i.e., the aperture ratio is relatively small). In addition, since the aperture ratio of the pixel unit is proportional to the light-emitting brightness, the light quantity of area, where the aperture ratio of the pixel unit is relatively large, is relatively large (which makes it relatively bright), and the light quantity of area, where the aperture ratio of the pixel unit is relatively small, is relatively small (which makes it relatively dark), resulting in different brightness of the different areas for the curved surface display panel in the related art.

In an embodiment, taking the first area 11 as an example, it will be described in the following how to achieve uniform display brightness in the first area 11.

Figure 4:
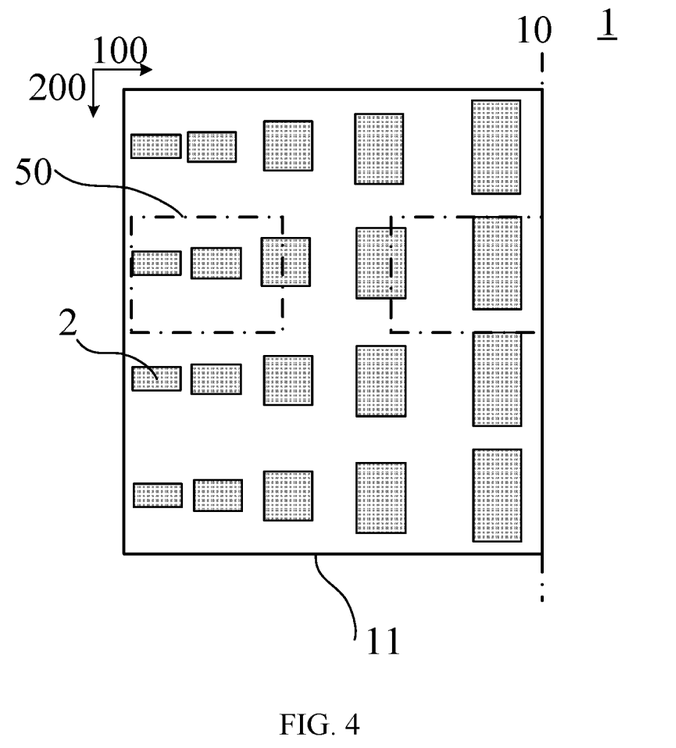
FIG. 4 is another structural schematic diagram of a color film substrate according to an embodiment of the present disclosure.

As shown in FIG. 4, FIG. 4 is another structural schematic diagram of a color film substrate according to an embodiment of the present disclosure. As can be seen from the top view shown in FIG. 4, a width of the respective interval between each adjacent two pixel units 2 becomes smaller and smaller along the first direction 100 from the first axis 10 to the edge of the first area 11 (leftmost in FIG. 1), and the respective width in the second direction 200 of each pixel unit 2 also becomes smaller and smaller along the first direction 100. It should be understood that, in the first direction 100, the distribution density of the pixel units 2 increases, that is, the pixel density of the pixel units 2 increases. In this case, the width of the pixel unit 2 in the area with a high pixel density decreases, that is, the aperture area of the pixel unit 2 in the area, where the pixel density is relatively high, decreases. Therefore, the sum of the aperture areas of all the pixel units 2 included in a same area range 50 is identical. Further, the aperture ratios of the pixel units 2 in a same area range 50 (i.e., the area enclosed by the dotted line frame) is identical. It indicates that a total amount of transmitted light in respective same area range 50 is identical. Thus, the brightness in a same area is identical, so that the display brightness in each area of the curved surface display panel is uniform, thereby improving display quality of the curved surface display panel. It may be referred to the description with respect of the first area 11 described above about how to achieve uniform display brightness of the second area 12, which will not be further described herein.

It should be understood that, the pixel density can be understood as the number of pixel units per unit area. Within a specific area range, the larger the number of pixel units, the higher the corresponding pixel density, otherwise the lower the pixel density. For example, with further reference to FIG. 4, as for the same area range 50, two and a half pixel units are included in the area range 50 away from the first axis 10, with a relatively high pixel density; one and a half pixel units are included in an area range 50 close to the first axis 10, with a relatively low pixel density.

It should be noted that, as an example, as shown in FIGS. 2-4, the first direction 100 is a horizontal direction in the figures, however, the first direction 100 may also be a vertical direction in the figures, and the first direction 100 will not be limited by the embodiments. It should also be understood that, when the first direction 100 is a horizontal direction in the figures, it means that the curved surface display panel has a certain curvature along the horizontal direction, in this case, the curved surface display panel is a horizontal curved surface display panel; when the first direction 100 is a vertical direction in the figures, it means that the curved surface display panel has a certain curvature along the vertical direction, in this case, the curved surface display panel is a vertical curved surface display panel. Both the horizontal curved surface display panel and the vertical curved surface display panel are within the protection scope of this embodiments as long as they satisfy the above technical features.

Figure 5:
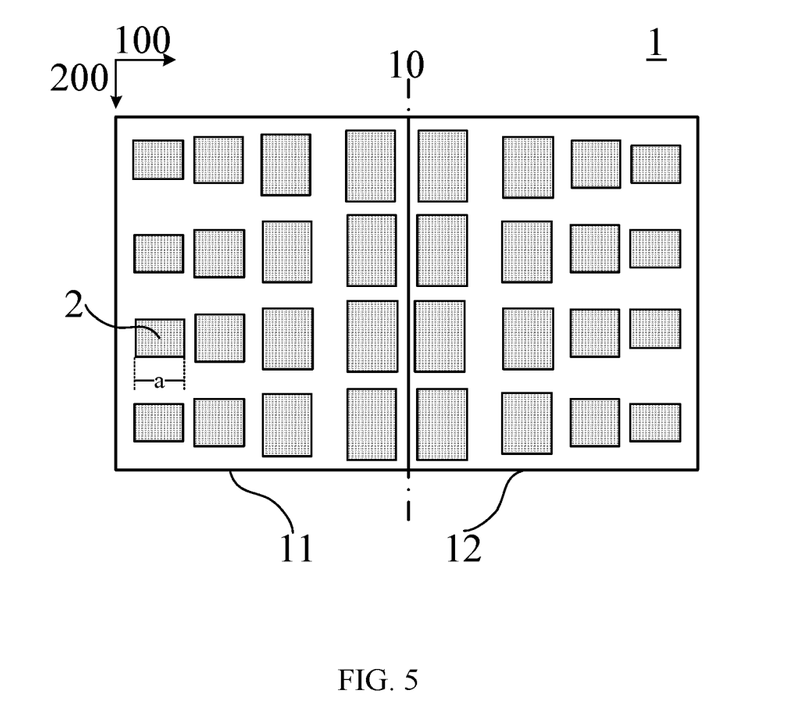
FIG. 5 is another structural schematic diagram of a color film substrate according to an embodiment of the present disclosure.

In an embodiment, with reference to FIG. 5, FIG. 5 is another structural schematic diagram of a color film substrate according to an embodiment of the present disclosure. The respective area of each pixel unit 2 decreases from the axis 10 towards each side of the first axis 10 along the first direction 100. Pixel units 2 each have an equal width a in the first direction 100. It can be seen from the above-described embodiments that, a width of the respective interval between each adjacent two pixel units 2 decreases with the first axis 10 as an axis, that is, the contribution density of the pixel units 2 increases and the pixel density increases. In this case, the area of the pixel unit 2 decreases, that is, in the area with a relatively high pixel density, since the area of the pixel unit 2 is relatively small, the aperture ratio is relatively small, so that the brightness of this area decreases; in the area with a relatively low pixel density, since the area of the pixel unit 2 is relatively large, the aperture ratio is relatively large, so that the brightness of this area increases. Therefore, the brightness of the area with a high pixel density and the brightness of the area with a low pixel density may be relatively balanced, so that relatively uniform brightness of the entire curved surface display panel may be achieved, thereby improving the display quality of the curved surface display panel.

The respective area of each pixel unit decreases from the axis towards each side of the first axis along the first direction. It can be understood as that, both the width in the first direction and the width in the second direction of each pixel unit decreases; and it can also be understood as that, only one of the width in the first direction and the width in the second direction of each pixel unit decreases, while the other one of the width in the first direction and the width in the second direction of each pixel unit keeps unchanged. In an embodiment, since pixel units each have an equal width a in the first direction, which can be understood as a reference value, when the respective area of each pixel unit decreases from the axis towards each side of the axis along the first direction, only the respective width in the second direction of each pixel unit decreases, which is for facilitating calculation of the width value in the second direction of the pixel unit (the reasons will be described hereinafter). In addition, since the respective interval between adjacent pixel units changes in the first direction, i.e., since the pixel units are not uniformly distributed in the first direction, the change to the respective area of each pixel unit is achieved as far as possible by changing the width of the pixel unit in the second direction. That is, pixel units each have an equal width in the first direction, so that it can be avoided that the differences in the pixel distribution and the pixel structure are concentrated in the first direction, which is beneficial for improving the display effect.

It should be noted that, FIG. 5 exemplarily shows a plurality of pixel units 2. In fact, the number of the pixel units 2 included in the curved surface display panel 500 is much larger than the number shown, and the number of the pixel units will not be limited by the embodiments. In addition, the shape of the pixel units 2 is not limited to a rectangle as shown in FIG. 5, and FIG. 5 only exemplarily shows the shape of the pixel unit 2 as a rectangle. For example, the pixel units may also be ellipse-shaped, wherein the long axis direction of the elliptical-shaped pixel unit is disposed along the second direction, and the short axis direction of the elliptical pixel unit is disposed along the first direction, as long as the pixel unit can satisfy the above-mentioned technical features. In addition, the pixel unit in the embodiments can be understood as a color resist having a specific color, and it can also be understood as a combination of color resists including a plurality of specific colors.

Further, with further reference to FIG. 5, the first axis 10 is a first symmetric axis, and the first area 11 is symmetrical to the second area 12 with respect to the first symmetric axis. That is, the first area 11 is mirror-symmetrical to the second area 12 with respect to the first axis 10. Since the curved surface display panel 500 is formed as a mirror-symmetry structure, in preparation of the pixel mask, a half of the pixel unit arrangement can be first designed, and then the other half can be further designed according to mirror-symmetry structure, so that the pixel mask for the curved surface display panel 500 can be prepared more quickly.

Figure 6:
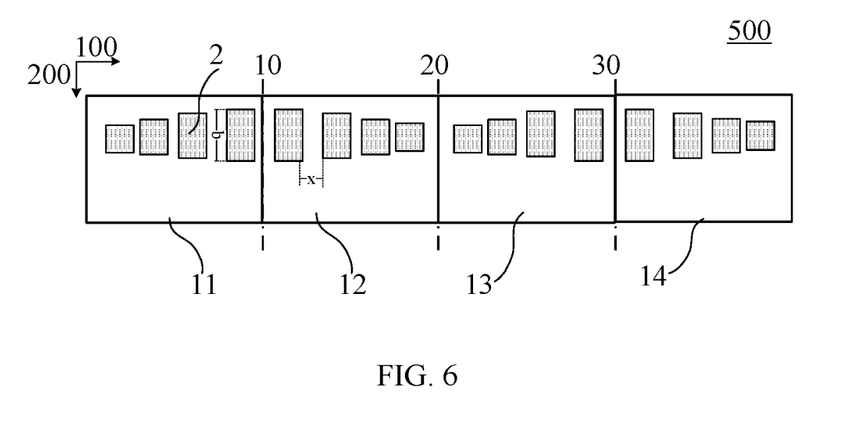
FIG. 6 is another structural schematic diagram of a curved surface display panel according to an embodiment of the present disclosure.

In an available implementation manner, as shown in FIG. 6, FIG. 6 is another structural schematic diagram of a curved surface display panel according to an embodiment of the present disclosure. The color film substrate 1 further includes a third area 13 and a fourth area 14 arranged along the first direction 100. A common border between the third area 13 and the second area 12 is a second axis 20, and a common border between the third area 13 and the fourth area 14 is a third axis 30. That is, the first axis 10, the second axis 20, and the third axis 30 are sequentially arranged from the first area 11 along the first direction 100. A width of the respective interval x between each adjacent two pixel units 2 decreases from the first axis 10 towards each side of the first axis 10 along the first direction and from the third axis 30 towards each side of the third axis 30 along the first direction, respectively. A respective width b in the second direction 200 of each pixel unit 2 decreases from the first axis 10 towards each side of the first axis 10 along the first direction and from the third axis 30 towards each side of the third axis 30 along the first direction, respectively.

Optionally, the second axis is closer to a center position of the display panel than the first axis and the third axis. The display panel includes a first edge and a second edge opposite to the first edge, the first edge is located in the first area, and the second edge is located in the fourth area. The first axis is located between the center position of the display panel and the first edge, and the third axis is located between the center position of the display panel and the second edge. Optionally, the first axis, the second axis and the third axis are all parallel to the second direction and perpendicular to the first direction. In this case, the structural changes of the color film substrate are consistent along any direction parallel to the first direction in the display panel. That is, the pixel units on the color film substrate are uniformly distributed on the display panel along any direction parallel to the second direction.

With further reference to FIG. 6, based on the orientation shown in FIG. 6, in the curved surface display panel 500, since the edges of the color film substrate 1 and the edges of the array substrate 4 are bonded together by encapsulation adhesive, the edge area of the color film substrate is relatively fixed to that of the array substrate, that is, two sides (one side of the first area 11 away from the first axis 10 and one side of the fourth area 14 away from the third axis 30) of the curved surface display panel have a relatively small degree of misalignment with respect to the array substrate. In addition, the curved surface display panel 500 is curved toward both sides from the center position (the vicinity of the second axis 20). The closer to the center position of the curved surface display panel 500, the smaller the degree of the misalignment. Therefore, a position where the misalignment degree is relatively great is located between the center position and the two sides, which can be understood as the vicinity of the first axis 10 and the third axis 30. According to the above-described principle, on one hand, the aperture area of the pixel unit 2 at the position with a greater degree of misalignment is correspondingly enlarged, so that the light leakage problem caused by the misalignment may be avoided. On the other hand, the greater the misalignment degree (which can also be understood as, the larger the interval between pixel units), the lower the pixel density in this area. In an embodiment, the width of the pixel unit in the area with the lower pixel density is enlarged along the second direction, that is, the aperture ratio of the pixel unit in this area increases, and the brightness in this area with the lower pixel density increases. Similarly, the aperture ratio of the pixel unit in the area with the higher pixel density decreases, and the brightness in this area with the higher pixel density decreases, so that the brightness in the two areas is more balanced, thereby improving the brightness uniformity of the entire curved surface display panel.

With further reference to FIG. 6, the embodiments are described by taking the third area 13 as an example. A width of the respective interval x in the first direction 100 between each adjacent two pixel units 2 decreases along a direction facing away from the third axis 30. It should be understood that, as the width of the respective interval x decreases, the distribution density of the pixel units increases, that is, the pixel density increases. In an embodiment, the inventor proposes that, the respective width b in the second direction 200 of each pixel unit 2 decreases along the direction facing away from the third axis 30, that is, the aperture ratio of the pixel unit decreases along the direction in which pixel density increases, so that the aperture ratio of the pixel unit in the area with a lower pixel density is relatively small, and the aperture ratio of the pixel unit in the area with a higher pixel density is relatively large, and thus the pixel aperture ratios in the two areas are relatively balanced, and by balancing the aperture area of the pixel unit 2 in each area on the curved surface display panel, the display brightness in each area may be balanced. In the embodiments, the pixel density can be understood as the number of pixel units in per unit area, the higher the pixel density, the larger number of pixel units in per unit area.

Figure 7:
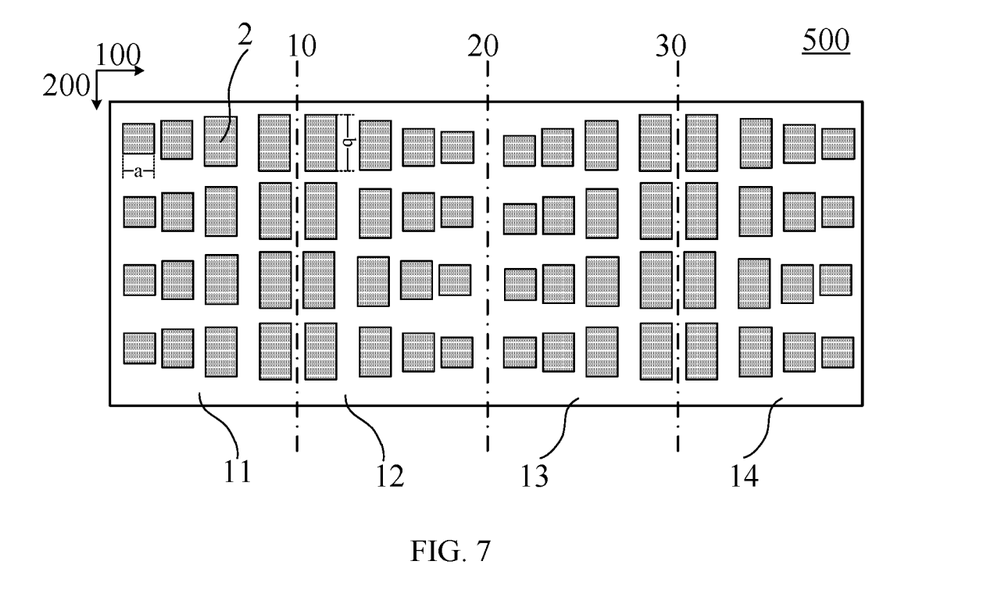
FIG. 7 is another structural schematic diagram of a curved surface display panel according to an embodiment of the present disclosure.

With reference to FIG. 7, FIG. 7 is another structural schematic diagram of a curved surface display panel according to an embodiment of the present disclosure. The respective area of each pixel unit 2 decreases from the first axis 10 towards each side of the first axis 10 and from the third axis 30 towards each side of the third axis 30, respectively. Pixel units 2 each have an equal width a in the first direction 100. In combination with the embodiments shown in FIG. 6, taking the third area 13 as an example, a width of the respective interval between each adjacent two pixel units 2 decreases along the first direction 100 and the area of each pixel unit 2 also decreases along the first direction 100, which indicates that the pixel aperture ratio is relatively small in the area with a relatively high pixel density, and the pixel aperture ratio is relatively large in the area with a relatively low pixel density, so that the pixel aperture ratio in each area on the curved surface display panel can be balanced, thereby balancing the display brightness of each area.

With further reference to FIG. 7, the first axis 10 may be a first symmetric axis, and the first area 11 is symmetrical to the second area 12 with respect to the first symmetric axis;

the third axis 30 is a third symmetric axis, and the third area 13 is symmetrical to the fourth area 14 with respect to the third axis; and the second axis 20 is a central symmetric axis, and the curved surface display panel 500 is symmetric with respect to the central symmetric axis.

In combination with the embodiments shown in FIG. 6, the second axis 20 is the central symmetric axis, that is, the curved surface display panel 500 is curved with the second axis as a center position. The misalignment degree of the position of the second axis 20 is relatively small. The misalignment degrees of both sides of the display panel 500 are also relatively small (with reference to the above description for specific reasons). The areas with greater misalignment degree are located at a position of one-quarter of the curved surface display panel 500 and a position of three-quarter of the curved surface display panel 500, i.e., in this embodiment, the position of the first symmetric axis and the position of the third symmetric axis respectively. In addition to the beneficial effects described above, the embodiments further have the following beneficial effects.

With more symmetric axes, the misalignment length may be decreased to some extent. Assuming that there is only one central symmetric axis, the maximum misalignment length may be one-half of an arc length of the curved surface display panel. In this embodiment, since there are three symmetric axes (the first axis, the second axis and the third axis), the curved surface display panel is divided into four areas, so that the respective misalignment length in each area is relatively small, which is beneficial to improving the display quality.

In addition, in this embodiment, the mirror-symmetric structure can facilitate the design of the pixel mask, that is, it only needs to design the arrangement of the pixel units in one quarter area, and the arrangement of the pixels in the remaining areas can be determined based on the mirror-symmetrical structure.

In an embodiment, with reference to FIG. 7, the respective interval between each adjacent pixel units 2 is arranged in an arithmetic progression manner in the first area 11, the second area 12, the third area 13, and the fourth area 14. In combination with the above embodiments, it should be understood that, with the first axis 10 and the third axis 30 as symmetric axes, the respective interval between each adjacent pixel units 2 decreases in the first direction 100. In this embodiment, in each area, the respective distance decreases in an arithmetic progression manner.

With reference to the embodiments shown in FIG. 2 to FIG. 7, according to the following formula, the respective area of each pixel unit in the first direction 100 in each area (the first area 11, the second area 12, the third area 13, and the fourth area 14) then can be calculated.

Figure 8:
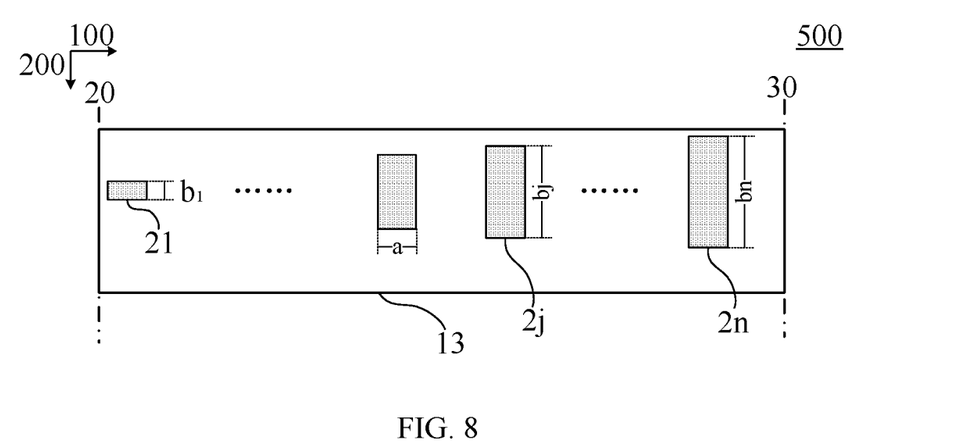
FIG. 8 is another structural schematic diagram of a curved surface display panel according to an embodiment of the present disclosure.

Each of the first area 11, the second area 12, the third area 13 and the fourth area 14 is provided with n pixel units along the first direction 100, as shown in FIG. 8. FIG. 8 is another structural schematic diagram of a curved surface display panel according to an embodiment of the present disclosure. Taking the third area 13 shown in FIG. 8 as an example, a method for calculating the width of a $j^{th}$ pixel units will be described in the following.

In FIG. 8, along the first direction 100, the respective width of each pixel unit in the second direction 200 decreases from the third axis 30 towards each side of the third axis 30. The pixel unit with the largest width in the third area 13 is referred to as a pixel unit $2n$, whose corresponding pixel width is represented as bn; and the pixel unit with the smallest width (i.e., the pixel unit farthest from the third axis in the third area 13) is referred to as 21, whose corresponding pixel width is represented as $b_1$. In this case, the width $b_j$ of a $j^{th}$ pixel unit $2j$ in the second direction 200 can be calculated by the following formula.

$$b_j=b_1+[\Delta L(j-1)b_1/(n*a)]$$

In the above formula, $b_1$ represents the width in the second direction 200 of the pixel unit 21 that is farthest from the third symmetric axis (the third axis 30) in the third area 13. $\Delta L$ represents the maximum misalignment width in the first direction 100 of the pixel unit in the first area, the second area, the third area, or the fourth area; a represents the width in the first direction of each pixel unit, and the pixel units $21\sim2n$ each have an identical width in the first direction 100; n represent the number of pixel units, and j represents a $j^{th}$ pixel unit, wherein $1\leq j\leq n$, and both j and n are natural numbers.

In the above embodiment, the third area 13 is taken as an example, and the width $b_1$ in the second direction 200 of the $j^{th}$ pixel unit $2j$ in the third area 13 is introduced. In fact, for each of the second area 12, the third area 13, and the fourth area 14, the respective width of each pixel unit in the respective area can be calculated. The only difference lies in that, the meaning of $b_1$ is different. In the first area 11, $b_1$ represents the width in the second direction 200 of the pixel unit farthest from the first axis 10 in the first direction; or in the second area 12, $b_1$ represents the width in the second direction 200 of the pixel unit farthest from the first axis 10 in the first direction; or in the fourth area, $b_1$ represents the width in the second direction 200 of the pixel unit farthest from the third axis in the first direction. The $b_1$ can be understood as the width in the second direction 200 of the pixel unit with the smallest area in the respective area (the first area, the second area, the third area, or the fourth area). In addition, it should be noted that, based on the orientation shown in FIG. 8, $\Delta L$ represents the maximum misalignment width in the first direction between the second axis 20 and the third axis 30, and $\Delta L$ can be understood as the misalignment distance between the color film substrate and the array substrate in a specific area (the first area, the second area, the third area, or the fourth area). Since the display panel is a curved surface display panel, the distance may be an arc length.

Figure 9:
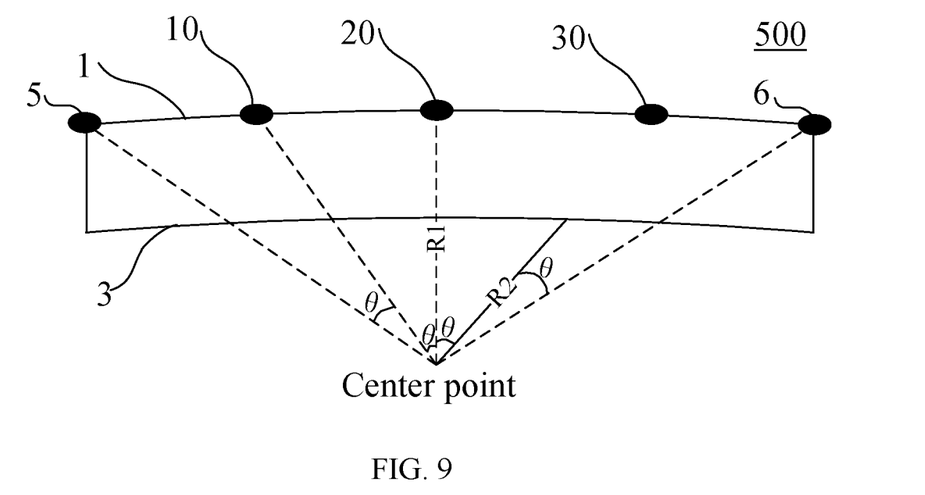
FIG. 9 is another structural schematic diagram of a curved surface display panel according to an embodiment of the present disclosure.

Further, as shown in FIG. 9, FIG. 9 is another structural schematic diagram of a curved surface display panel according to an embodiment of the present disclosure. As shown in FIG. 9, the center point represents a center of curvature of the curved surface display panel 500.

The maximum misalignment width $\Delta L$ is calculated by the following formula.

$$\Delta L=\theta*(R_1-R_2)$$

In the above formula, θ represents a central angle from the first symmetric axis (the first axis 10) to the second symmetric axis (the second axis 20), or a central angle from the second symmetric axis (the second axis 20) to the third symmetric axis (the third axis 30), or a central angle from a side 5 of the color film substrate 1 close to the first symmetric axis (the first axis 10) to the first symmetric axis (the first axis 10), or a central angle from a side 6 of the color film substrate 1 close to the third symmetric axis (the third axis 30) to the third symmetric axis (the third axis 30). $R_1$ and $R_2$ are respectively the radius of curvature of the color film substrate 1 and the radius of curvature of the array substrate 3.

It should be understood that, the maximum misalignment width $\Delta L$ can be understood as, in the third area 13, for the n pixel units, the sum of the misalignment widths of all the pixel units excluding the pixel units 21 (the first pixel unit 21 is a reference). It is a definite value for a specific curved surface panel. After the curvature of the specific curved surface panel is determined, both the radius $R_1$ and radius $R_2$ of the two opposite substrates (the color film substrate and the array substrate) in the specific curved surface panel are determined, and the corresponding maximum central angle θ in each area is also determined.

In this case, with further reference to FIG. 8, the third area 13 is taken as an example. In the third area 3, ΔL/n may represent an average misalignment distance of each pixel unit in the third area. In this case, the misalignment distance is associated to the first pixel unit 21, therefore, with respect to the first pixel unit 21, the misalignment distance of the $j^{th}$ pixel unit 2j may be (ΔL/n)*(j−1). In this case, since the misalignment distance is a distance along the first direction 100, the misalignment area of the $j^{th}$ pixel unit 2j can be obtained by multiplying the misalignment distance by the width in the second direction, which is ΔL/n*(j−1)*$b_1$. In this case, since all the pixel units in the third area 13 each have an equal width a in the first direction 100, the misalignment distance in the second direction of the pixel unit 2j then can be determined, which is [(ΔL/n)*(j−1)*$b_1$]/a; finally, the misalignment distance is compensated to the $j^{th}$ pixel unit 2j, and thus the width in the second direction 200 of the $j^{th}$ pixel unit 2j is $b_1$=$b_1$+[ΔL(j−1)$b_1$/n*a].

For example, taking a 13.3-inch horizontal curved surface panel as an example, on the color film substrate, a total of 320 color resists (pixel units) are disposed along the first direction from the one-quarter symmetric axis to the central symmetric axis, and the maximum misalignment is approximately 5 μm. On the array substrate, a width of the respective interval between each adjacent two pixel units decreases in an equal-difference manner from the one-quarter symmetric axis to the central symmetric axis, and the maximum interval width between adjacent two pixels is 8.4 μm and the minimum interval width is 3.6 μm. At the position with a relatively large misalignment distance, the aperture area of the pixel unit relatively increases, so that the light leakage problem of the pixel unit may be alleviated. Moreover, by virtue of the above formula, the respective width in the second direction of each pixel unit at each position can be calculated, the width is positively correlated with the interval width in the first direction between adjacent two pixel units, that is, for the area with a relatively small interval, the distribution density of the pixel units is relatively high, and the width in the second direction of the pixel unit is relatively small, and thus the aperture ratio of the pixel unit in this area relatively decreases; otherwise, the aperture ratio of the pixel unit relatively increases, so that the aperture ratio of the pixel unit in each area can be balanced, and thus the aperture ratio of the pixel unit in each area is relatively balanced, thereby improving the display quality.

In addition, as an example, the color film substrate 1 shown in FIG. 9 is disposed at a convex side of the curved surface display panel 500, that is, light is emitted from the convex surface. The color film substrate may be disposed at a concave side of the curved surface display panel 500, that is, light is emitted from the concave surface. The light-emitting side of the curved surface display panel will not be limited herein.

Figure 10:
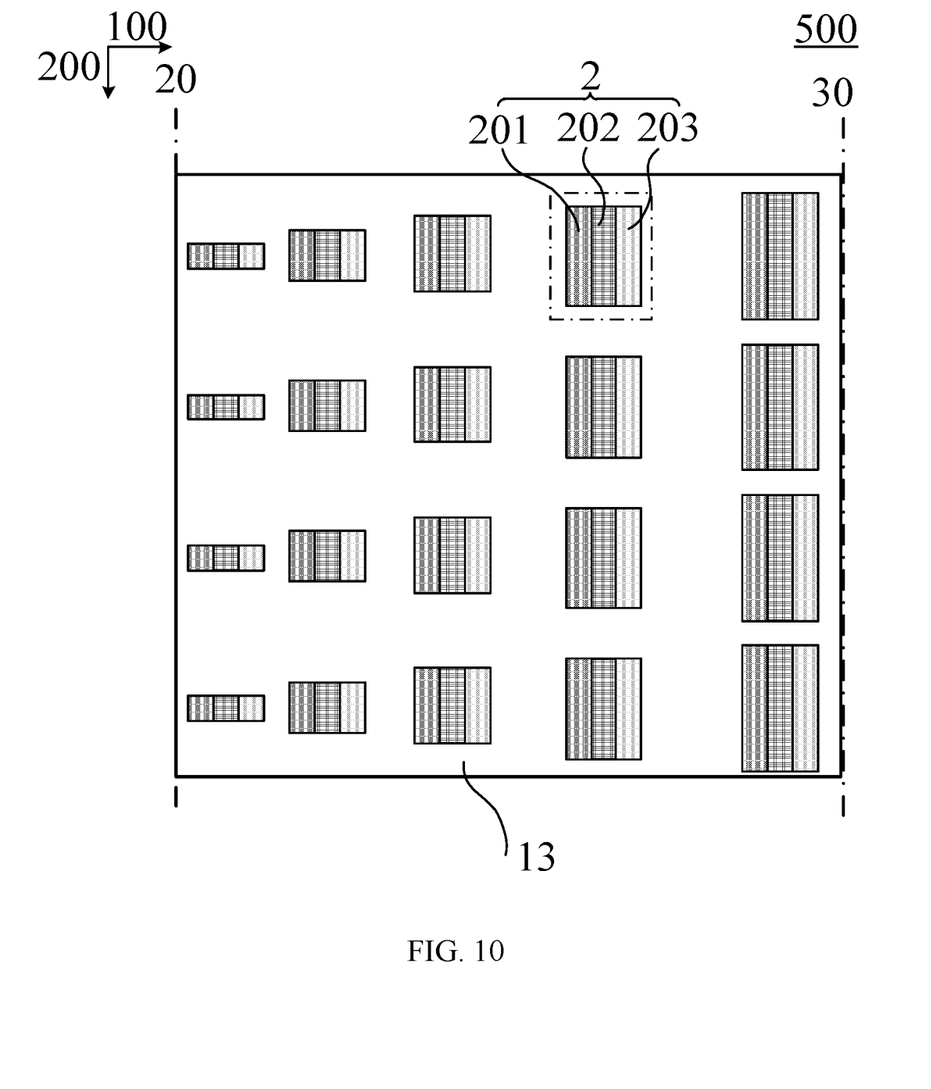
FIG. 10 is another structural schematic diagram of a curved surface display panel according to an embodiment of the present disclosure.

In an embodiment, as shown in FIG. 10, FIG. 10 is another structural schematic diagram of a curved surface display panel according to an embodiment of the present disclosure. The pixel units 2 are arranged in an array on the color film substrate. Moreover, the pixel unit 2 may include a first color sub-pixel 201, a second color sub-pixel 202 and a third color sub-pixel 203, each of which is one of a red sub-pixel, a green sub-pixel, and a blue sub-pixel.

In the embodiment, the respective width in the second direction of each pixel unit can be calculated based on the above formula. In this case, since the pixel unit 2 includes three sub-pixels (201-203) with different colors, the width in the second direction of each sub-pixel can be calculated all at once. Moreover, in the embodiments, although the respective width in the second direction of each pixel unit 2 decreases from the first axis towards each side of the first axis and from the third axis towards each side of the third axis, since the aperture areas of the three sub-pixels included by each pixel unit located at an arbitrary position vary by a same proportion, the display effect will not be deteriorated when displaying white light.

In addition, with further reference to FIG. 10, in the direction from the third axis 30 to the second axis 20, the respective width in the second direction 200 of each pixel unit 2 decreases. It should be understood that, on the color film substrate, the total area excluding the positions of the pixel units is sheltered by a black matrix (not shown in the figure), therefore, the respective width in the second direction of the black matrix increases in the direction from the third axis 30 to the second axis 20. In this case, the width in the second direction of the black matrix close to the third axis 30 is the smallest, and the smallest width of the black matrix is still capable of sheltering the corresponding metal wiring, so that the display of the curved surface display panel will not be deteriorated. Still taking the 13.3-inch horizontal curved surface panel as an example, the maximum variation of the width of the black matrix is 1 μm, that is, the maximum decreasing distance of the black matrix is 1 μm, and the remaining black matrix is enough to shelter the metal wiring on the array substrate, and thus the normal display of the curved surface display panel will not be influenced.

In an embodiment, with further reference to FIG. 1, the curved surface display panel 500 may be a liquid crystal curved surface display panel, and the specific structures thereof may be reference to the above description.

Taking the liquid crystal curved surface display panel as an example, the display principle of the liquid crystal curved surface display panel will be described in the following.

As shown in FIG. 1 and FIG. 8, the array substrate 3 is provided with a plurality of sub-pixels (201-203) defined by a plurality of rows of gate lines (not shown) and a plurality of columns of data lines (not shown) in an intersecting manner, each of the sub-pixels (201, 202 or 203) is provided with a thin film transistor, a pixel electrode and a common electrode. Each thin film transistor has a gate electrode connected to a gate line, a source electrode connected to a data line, and a drain electrode connected to a pixel electrode. Under the control of the corresponding gate line, the data line corresponding to the source electrode of the thin film transistor performs charging/discharging, through the thin film transistor, to the pixel electrode corresponding to the drain electrode. An electric field is formed between the pixel electrode and the common electrode. During displaying of the liquid crystal display panel, i.e., during the display stage, the common electrode receives a common voltage signal (usually a constant voltage signal), an electric field is formed between the pixel electrode and the common electrode to control the liquid crystal molecules in the liquid crystal layer to rotate, so that the display function can be achieved.

Figure 11:
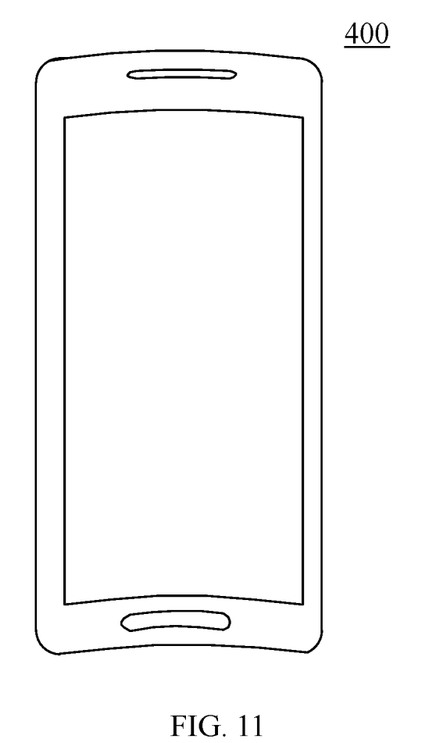
FIG. 11 is a structural schematic diagram of a display device according to an embodiment of the present disclosure.

The present disclosure provides a display device, as shown in FIG. 11. FIG. 11 is a structural schematic diagram of a display device according to an embodiment of the present disclosure. The display device 400 includes a display panel 500 described in the above-described embodiments. It should be noted that, FIG. 11 takes a cellphone as an example of the display device, however, the display device is not limited to a cellphone. The display device may include but is not limited to any electrical device having a display function, such as a personal computer (PC), a personal digital assistant (PDA), a wireless handheld device, a tablet computer, an mp4 player, a television and the like.

Finally, it should be noted that, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A curved surface display panel, comprising a color film substrate having an arc-shaped cross section along a first direction, wherein the color film substrate comprises:
    a first area and a second area arranged along the first direction, wherein a common border between the first area and the second area is a first axis; and
    a plurality of pixel units arranged along the first direction, wherein a respective interval separates each adjacent two pixel units of the plurality of pixel units, and the plurality of pixel units each has a respective width in a second direction, a width of the respective interval between each adjacent two pixel units decreases along the first direction from the first axis towards each side of the first axis along the first direction, and the respective width in the second direction of each pixel unit decreases from the first axis towards each side of the first axis along the first direction;
    wherein the first direction intersects with the second direction, and
    wherein the plurality of pixel units each have a respective area, the respective area of each pixel unit decreases from the first axis towards each side of the first axis along the first direction, and the plurality of pixel units each have an identical width in the first direction.

2. The curved surface display panel according to claim 1, wherein the first axis is a first symmetric axis, and the first area is symmetrical to the second area with respect to the first symmetric axis.

3. A curved surface display panel, comprising a color film substrate having an arc-shaped cross section along a first direction, wherein the color film substrate comprises:
    a first area and a second area arranged along the first direction, wherein a common border between the first area and the second area is a first axis; and
    a plurality of pixel units arranged along the first direction, wherein a respective interval separates each adjacent two pixel units of the plurality of pixel units, and the plurality of pixel units each has a respective width in a second direction, a width of the respective interval between each adjacent two pixel units decreases along the first direction from the first axis towards each side of the first axis along the first direction, and the respective width in the second direction of each pixel unit decreases from the first axis towards each side of the first axis along the first direction;
    wherein the first direction intersects with the second direction,
    wherein the color film substrate further comprises a third area and a fourth area arranged along the first direction, wherein a common border between the third area and the second area is a second axis, and a common border between the third area and the fourth area is a third axis, and
    the width of the respective interval between each adjacent two pixel units decreases from the first axis towards each side of the first axis along the first direction and from the third axis towards each side of the third axis along the first direction, and the respective width in the second direction of each pixel unit decreases from the first axis towards each side of the first axis along the first direction and from the third axis towards each side of the third axis along the first direction.

4. The curved surface display panel according to claim 3, wherein the respective area of each pixel unit decreases from the first axis towards each side of the first axis along the first direction and from the third axis towards each side of the third axis along the first direction, and the plurality of pixel units each has an identical width in the first direction.

5. The curved surface display panel according to claim 4, wherein the first axis is a first symmetric axis, and the first area is symmetrical to the second area with respect to the first symmetric axis; the third axis is a third symmetric axis, and the third area is symmetrical to the fourth area with respect to the third symmetric axis; and the second axis is a central symmetric axis, and the curved surface display panel is symmetric with respect to the central symmetric axis.

6. The curved surface display panel according to claim 5, wherein for each of the first area, the second area, the third area, and the fourth area, a width difference between adjacent two intervals is constant.

7. The curved surface display panel according to claim 6, wherein each of the first area, the second area, the third area and the fourth area is provided with n pixel units along the first direction, a width $b_j$ in the second direction of a $j^{th}$ pixel unit is calculated by a formula of:

$$b_j = b_1 + [\Delta L(j-1)b_1/(n*a)]$$

wherein $b_1$ represents a width in the second direction of the pixel unit that is farthest from the first symmetric axis in the first area, or a width in the second direction of the pixel unit that is farthest from the first symmetric axis in the second area, or a width in the second direction of the pixel unit that is farthest from the third symmetric axis in the third area, or a width in the second direction of the pixel unit that is farthest from the third symmetric axis in the fourth area; $\Delta L$ represents a maximum misalignment width in the first direction of the pixel unit in the first area, the second area, the third area, or the fourth area; a represents a width in the first direction of the pixel unit; and j represents a $j^{th}$ pixel unit, wherein $1 \leq j \leq n$, and both j and n are natural numbers.

8. The curved surface display panel according to claim 7, wherein the curved surface display panel further comprises an array substrate opposite to the color film substrate, the maximum misalignment width $\Delta L$ is calculated by the following formula:

$$\Delta L = \theta*(R_1 - R_2)$$

wherein θ represents a central angle from the first symmetric axis to the second symmetric axis, or a central angle from the second symmetric axis to the third symmetric axis, or a central angle from a side of the color film substrate in vicinity of the first symmetric axis to the first symmetric axis, or a central angle from a side of the color film substrate in vicinity of the third symmetric axis to the third symmetric axis; and $R_1$ and $R_2$ are respectively a radius of curvature of the color film substrate and a radius of curvature of the array substrate.

9. The curved surface display panel according to claim 1, wherein the plurality of pixel units is arranged in an array on the color film substrate.

10. The curved surface display panel according to claim 1, wherein the plurality of pixel units each comprises a first color sub-pixel, a second color sub-pixel and a third color sub-pixel, the first color sub-pixel is one of a red sub-pixel, a green sub-pixel, and a blue sub-pixel, the second color sub-pixel is one of the other two of the red sub-pixel, the green sub-pixel, and the blue sub-pixel, and the third color sub-pixel is the remaining one of the red sub-pixel, the green sub-pixel, and the blue sub-pixel.

11. The curved surface display panel according to claim 1, further comprising an array substrate opposite to the color film substrate, the curved surface display panel is a liquid crystal curved surface display panel, and the liquid crystal curved surface display panel comprises a liquid crystal layer disposed between the color film substrate and the array substrate.

12. A display device comprising a curved surface display panel, wherein the curved surface display panel comprises a color film substrate having an arc-shaped cross section along a first direction, wherein the color film substrate comprises:

a first area and a second area arranged along the first direction, wherein a common border between the first area and the second area is a first axis; and a plurality of pixel units arranged along the first direction, wherein a respective interval separates each adjacent two pixel units of the plurality of pixel units, and the plurality of pixel units each has a respective width in a second direction, a width of the respective interval between each adjacent two pixel units decreases along the first direction from the first axis towards each side of the first axis along the first direction, and the respective width in the second direction of each pixel unit decreases from the first axis towards each side of the first axis along the first direction;

wherein the first direction intersects with the second direction.

13. The curved surface display panel according to claim 3, wherein the plurality of pixel units is arranged in an array on the color film substrate.

14. The curved surface display panel according to claim 3, wherein the plurality of pixel units each comprises a first color sub-pixel, a second color sub-pixel and a third color sub-pixel, the first color sub-pixel is one of a red sub-pixel, a green sub-pixel, and a blue sub-pixel, the second color sub-pixel is one of the other two of the red sub-pixel, the green sub-pixel, and the blue sub-pixel, and the third color sub-pixel is the remaining one of the red sub-pixel, the green sub-pixel, and the blue sub-pixel.

15. The curved surface display panel according to claim 3, further comprising an array substrate opposite to the color film substrate, the curved surface display panel is a liquid crystal curved surface display panel, and the liquid crystal curved surface display panel comprises a liquid crystal layer disposed between the color film substrate and the array substrate.

* * * * *